United States Patent
Hviid et al.

(10) Patent No.: US 10,194,232 B2
(45) Date of Patent: Jan. 29, 2019

(54) RESPONSIVE PACKAGING SYSTEM FOR MANAGING DISPLAY ACTIONS

(71) Applicant: BRAGI GmbH, München (DE)

(72) Inventors: Nikolaj Hviid, München (DE); Arne D. Loermann, München (DE); Matthias Lackus, München (DE); Christian Begusch, München (DE)

(73) Assignee: BRAGI GmbH, München (DE)

( * ) Notice: Subject to any disclaimer, the term of this patent is extended or adjusted under 35 U.S.C. 154(b) by 331 days.

(21) Appl. No.: 15/244,983

(22) Filed: Aug. 23, 2016

(65) Prior Publication Data

US 2017/0064437 A1    Mar. 2, 2017

Related U.S. Application Data

(60) Provisional application No. 62/211,737, filed on Aug. 29, 2015.

(51) Int. Cl.
| | |
|---|---|
| *H04R 1/10* | (2006.01) |
| *H04B 5/00* | (2006.01) |

(Continued)

(52) U.S. Cl.
CPC ......... *H04R 1/1091* (2013.01); *B65D 5/4212* (2013.01); *B65D 25/54* (2013.01); *B65D 51/02* (2013.01); *B65D 75/563* (2013.01); *F21S 9/02* (2013.01); *F21V 33/0056* (2013.01); *G01P 13/00* (2013.01); *G08B 7/06* (2013.01); *H02J 7/0044* (2013.01); *H02J 7/0047* (2013.01); *H04B 5/0068* (2013.01); *H04R 1/1025* (2013.01); *H05B 37/0227* (2013.01);

(Continued)

(58) Field of Classification Search
CPC .................................................. H04R 1/1091
USPC ............................................................ 235/375
See application file for complete search history.

(56) References Cited

U.S. PATENT DOCUMENTS

| | | |
|---|---|---|
| 3,934,100 A | 1/1976 | Harada |
| 4,150,262 A | 4/1979 | Ono |

(Continued)

FOREIGN PATENT DOCUMENTS

| | | |
|---|---|---|
| EP | 1017252 A2 | 7/2000 |
| GB | 2074817 | 4/1981 |

(Continued)

OTHER PUBLICATIONS

International Search Report & Written Opinion, PCT/EP2016/070231 (dated Nov. 18, 2016).

(Continued)

*Primary Examiner* — Michael G Lee
*Assistant Examiner* — David Tardif
(74) *Attorney, Agent, or Firm* — Goodhue, Coleman & Owens, P.C.

(57) ABSTRACT

A packaging system and method for wireless earpieces. The packaging system includes wireless earpieces includes one or more sensors and a near field communication chip. The near field communication chip communicates with a number of packaging systems adjacent to the packaging system if present. The packaging system further includes packaging defining a window for displaying the wireless earpieces. The packing prevents damage to the wireless earpieces. The packaging performs a display action in response to a display criteria being met.

20 Claims, 5 Drawing Sheets

(51) Int. Cl.

| | | |
|---|---|---|
| B65D 25/54 | (2006.01) | |
| B65D 51/02 | (2006.01) | |
| B65D 75/56 | (2006.01) | |
| H05B 37/02 | (2006.01) | |
| F21S 9/02 | (2006.01) | |
| F21V 33/00 | (2006.01) | |
| H02J 7/00 | (2006.01) | |
| G01P 13/00 | (2006.01) | |
| G08B 7/06 | (2006.01) | |
| F21Y 115/10 | (2016.01) | |
| B65D 5/42 | (2006.01) | |

(52) U.S. Cl.
CPC ........ *B65D 5/4204* (2013.01); *B65D 2203/12* (2013.01); *F21Y 2115/10* (2016.08); *H04R 2420/07* (2013.01)

(56) References Cited

U.S. PATENT DOCUMENTS

| | | |
|---|---|---|
| 4,334,315 A | 6/1982 | Ono et al. |
| 4,375,016 A | 2/1983 | Harada |
| 4,588,867 A | 5/1986 | Konomi |
| 4,654,883 A | 3/1987 | Iwata |
| 4,682,180 A | 7/1987 | Gans |
| 4,791,673 A | 12/1988 | Schreiber |
| 4,865,044 A | 9/1989 | Wallace et al. |
| 5,191,602 A | 3/1993 | Regen et al. |
| 5,201,007 A | 4/1993 | Ward et al. |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,363,444 A | 11/1994 | Norris |
| 5,497,339 A | 3/1996 | Bernard |
| 5,606,621 A | 2/1997 | Reiter et al. |
| 5,613,222 A | 3/1997 | Guenther |
| 5,692,059 A | 11/1997 | Kruger |
| 5,721,783 A | 2/1998 | Anderson |
| 5,749,072 A | 5/1998 | Mazurkiewicz et al. |
| 5,771,438 A | 6/1998 | Palermo et al. |
| 5,802,167 A | 9/1998 | Hong |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,084,526 A | 7/2000 | Blotky et al. |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,275,789 B1 | 8/2001 | Moser et al. |
| 6,339,754 B1 | 1/2002 | Flanagan et al. |
| 6,408,081 B1 | 6/2002 | Boesen |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| 7,463,902 B2 | 12/2008 | Boesen |
| 7,508,411 B2 | 3/2009 | Boesen |
| 7,983,628 B2 | 7/2011 | Boesen |
| 8,140,357 B1 | 3/2012 | Boesen |
| 9,387,154 B2 * | 7/2016 | Aggarwal ................ A61J 7/04 |
| 9,760,691 B2 * | 9/2017 | Seeger ................ A61J 7/0418 |
| 9,773,743 B2 * | 9/2017 | Maijala ................ A61J 1/035 |
| 2001/0005197 A1 | 6/2001 | Mishra et al. |
| 2001/0027121 A1 | 10/2001 | Boesen |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0074671 A1 | 4/2006 | Farmaner et al. |
| 2006/0074808 A1 | 4/2006 | Boesen |
| 2008/0254780 A1 | 10/2008 | Kuhl et al. |
| 2009/0008275 A1 | 1/2009 | Ferrari et al. |
| 2009/0261114 A1 | 10/2009 | McGuire et al. |
| 2011/0140844 A1 * | 6/2011 | McGuire ................ G09F 3/0291 340/6.1 |
| 2011/0239497 A1 | 10/2011 | McGuire et al. |
| 2013/0285681 A1 * | 10/2013 | Wilson ................ H05K 1/118 324/693 |
| 2017/0038325 A1 * | 2/2017 | Takashima ......... G06K 19/0717 |

FOREIGN PATENT DOCUMENTS

| | | |
|---|---|---|
| JP | 06292195 | 10/1998 |
| WO | 2014043179 A2 | 3/2014 |
| WO | 2015110577 A1 | 7/2015 |
| WO | 2015110587 A1 | 7/2015 |

OTHER PUBLICATIONS

Announcing the $3,333,333 Stretch Goal (Feb. 24, 2014).
BRAGI is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, A Lot to Be Done Over Christmas (Dec. 22, 2014).

(56) References Cited

OTHER PUBLICATIONS

BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing—Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, On Track(May 16, 2015).
BRAGI Update—Beta2 Production and Factory Line(Aug. 20, 2015).
BRAGI Update—Certifications, Production, Ramping Up (Nov. 13, 2015).
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2014).
BRAGI Update—On Track, Design Verification, How It Works and What's Next(Jul. 15, 2015).
BRAGI Update—On Track, On Track and Gems Overview (Jun. 24, 2015).
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Last Push Before the Kickstarter Campaign Ends on Monday 4pm CET (Mar. 28, 2014).
Staab, Wayne J., et al., "A One-Size Disposable Hearing Aid is Introduced", The Hearing Journal 53(4):36-41) Apr. 2000.
Stretchgoal—Its Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).

* cited by examiner

RESPONSIVE PACKAGING SYSTEM FOR MANAGING DISPLAY ACTIONS

PRIORITY STATEMENT

This application claims priority to U.S. Provisional Patent Application No. 62/211,737, filed Aug. 29, 2016, hereby incorporated by reference in its entirety.

BACKGROUND

I. Field of the Disclosure

The present invention relates to packaging systems. More specifically, but not exclusively, the present invention relates to packaging systems for electronic devices.

II. Description of the Art

The growth of wearable devices is increasing exponentially. This growth is fostered by the decreasing sizes of microprocessors, circuit boards, chips, and other components. Many times it is difficult for potential buyers to notice new electronic devices, especially in retail spaces. Manufacturers must balance attracting potential buyer's attention with preserving resources (e.g., batteries, packaging materials, advertising materials, etc.). The situation may be even more difficult for manufacturers that would like to visually and functionally represent their product to potential buyers.

SUMMARY OF THE DISCLOSURE

One embodiment provides a packaging system and method for wireless earpieces. The packaging system includes wireless earpieces includes one or more sensors and a near field communication chip. The near field communication chip communicates with a number of packaging systems adjacent to the packaging system if present. The packaging system further includes packaging defining a window for displaying the wireless earpieces. The packing prevents damage to the wireless earpieces. The packaging performs a display action in response to a display criteria being met.

Another embodiment provides a packaging system. The packaging system includes product secured by packaging. The packaging includes one or more sensors and a near field communication chip. The packaging defines a window for displaying the product. The packaging prevents damage to the product. The packaging performs a display action in response to a display criteria being met. The packaging system may further include a smart case securing the product and powering the product during storage utilizing a battery of the smart case. The window may be a transparent window, a transparent LCD, or electronic ink. The near field communication chip may communicate with a plurality of other packaging systems proximate the packaging system. The packaging system may coordinate the display action with the plurality of packaging systems in response to determining the plurality of packaging systems are proximate the packaging system. The packaging system may use processing power of the product to determine whether the display criteria are met. The packaging system may include one or more sensors that detect the display criteria.

Yet another embodiment provides a method of managing display actions performed by a packaging system. A location and an orientation of the packaging system is determined. A determination is made whether display criteria are met. A display action is performed utilizing an interface of the packaging system to attract attention of a user in response to the display criteria being met. The packaging system may include at least a pair of wireless earpieces and a smart case for the pair of wireless earpieces. The location and the orientation of the packaging system may be determined utilizing one or more sensors of the pair of wireless earpieces. The location and the orientation of the packaging system may be determined utilizing one or more of the sensors of the packaging system. The performing the display action may include lighting up an LED array of one or more of the pair of wireless earpieces and the smart case and/or activation of a display, where the display is one of a transparent liquid crystal display, an e-ink color display, and an e-ink black and white display. The display action may be activated by detection of a galvanic sensor. The one or more sensors may include an accelerometer and a photo sensor. The one or more sensors may be included in the packaging system. The method may further include synchronizing the display action with a plurality of packaging systems proximate the packaging system. The location of the packaging system may be determined utilizing near field communication with other packaging systems proximate the packaging system. The display criteria may include determining whether the packaging system is visible to a user, determining whether motion of the packaging system or proximate the packaging system is detected, and/or determining whether the packaging system is visible to a user. The display criteria may include physical contact sensed by the packaging system such as be detected by a galvanic sensor of the packaging system. The method may further include entering a power saving mode wherein the display action is not performed in response to determining the packaging system is not visible to a user and the packaging system may enter the power saving mode in response to measurements made by sensors within the packaging system.

BRIEF DESCRIPTION OF THE DRAWINGS

Illustrated embodiments of the present invention are described in detail below with reference to the attached drawing figures, which are incorporated by reference herein, and where.

DETAILED DESCRIPTION OF THE DISCLOSURE

Figure 1:
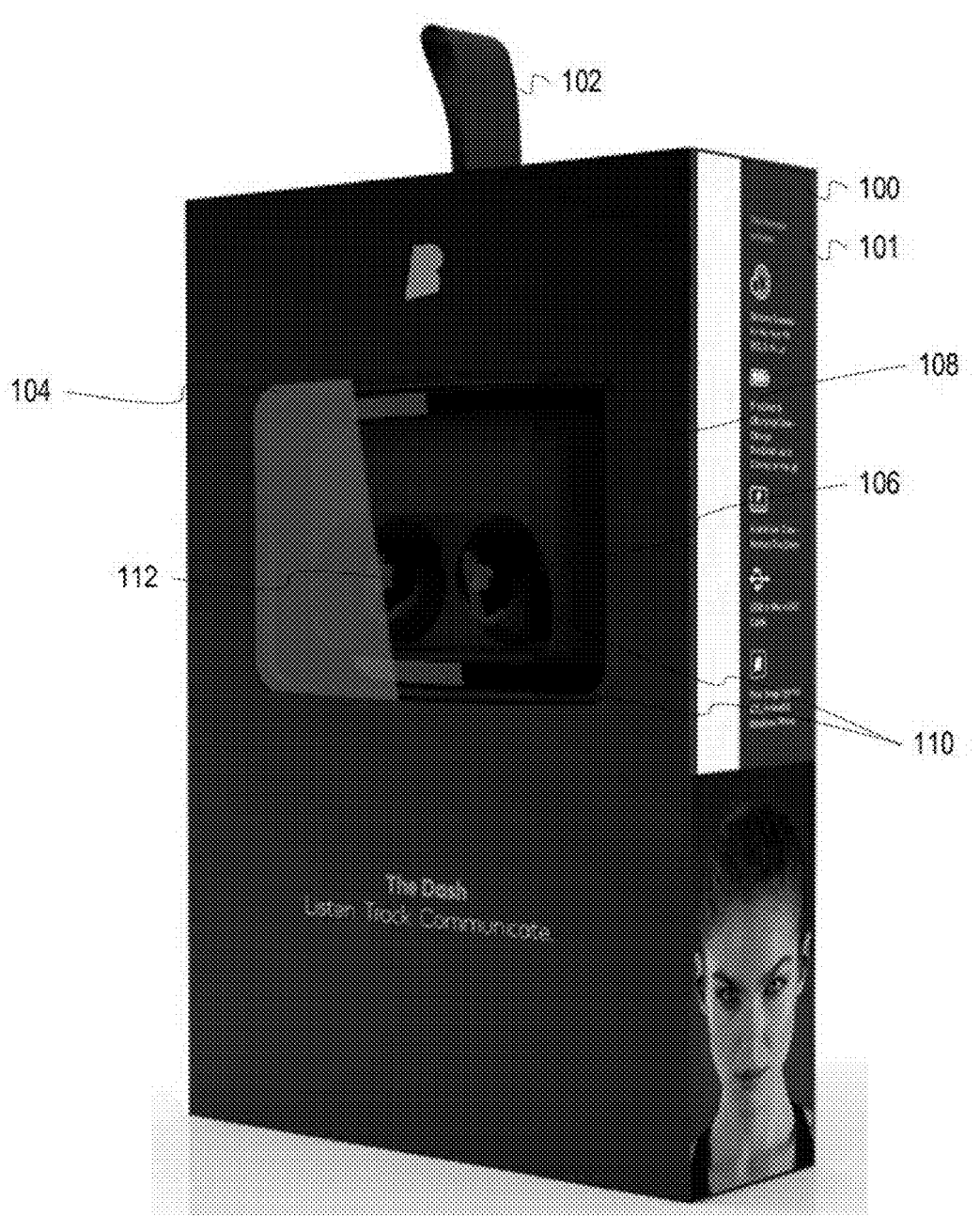
FIG. 1 is a pictorial representation of a packaging system in accordance with an illustrative embodiment.

The illustrative embodiments provide a packaging system and method for utilizing near field communication for packaging systems in accordance with an illustrative embodiment. The packaging system may utilize intelligence of the packaging components or devices to enhance the display characteristics and attractiveness of the overall packaging system. In one embodiment, the packaging system may utilize the sensors, light emitters, and other functionality of the enclosed electronics to attract buyers and raise interest in the electronic device(s) within the packaging system. For example, the electronic device(s) may be a pair of wireless earpieces as is illustrated herein. However, any number of electronic devices suitable for utilization by users may be enclosed within the packaging system. The contents of the packaging system, electronic or not, may also be referred to as a product, products, or contents. Reference to the electronic device or devices or wireless earpieces may refer to individual devices, sets of devices, or a number of different devices. Buyers, potential buyers, or individual users of the electronic devices may be referenced interchangeably.

The illustrative embodiments may utilize a transparent window, liquid crystal display, screen, or opening to visually display the electronic device. The window may allow light emitters of the included electronics, such as light emitting diodes (LEDs), to be visible to a potential buyer. The transparent window may also act as an access point to interact with the functionality of the electronic device in a limited way. In one embodiment, near field communications may be utilized to determine a location and orientation of the packaging system when positioned or located next to or adjacent other similar packaging systems. The near field communications may also be utilized to determine the location, orientation, and distance to the other packaging systems. For example, proximity, location, and orientation information may be utilized to determine which of the packaging systems are visible to a user so that only the packaging systems visible to the user perform various processes. The packaging systems may be hung, stacked, or arranged for retail programs, buyer attraction displays, or so forth.

The sensors of the packaging system or the electronic device may also be utilized to determine when to perform the processes. For example, the sensors may include accelerometers, photo sensors, galvanic sensors, inertial sensors, gyroscopes, or so forth that determine when to activate the LEDs, or so forth. In other embodiments, the sensors or other components may be part of the packaging materials that may be discarded or no longer used once the electronic device is unboxed. The illustrative embodiments may utilize the resources of the packaged electronics to maximize the display, presentation, and buying experience of the overall packaging system. The illustrative embodiments provide for enhanced notoriety of the packaging system whether stacked, positioned, or hung from displays. As a result, the packaging system may maintain a fresh and potent appearance. In addition, the packaging system continues to maintain the safety and charge of the electronic devices in the packaging system so that they are protected and ready to use once the packaging system is opened by the buyer.

The packaging system may be utilized as a long term protection, care, and charging system for the wireless earpieces and the smart case. For example, the packaging system may include a solar panel or charging port for charging the various devices stored within the packaging system. The packaging system may be a secure device and location that provides for continued protection, charging, synchronization, and utilization of the packaging system beyond just a transport, protection, and display package.

Figure 2:
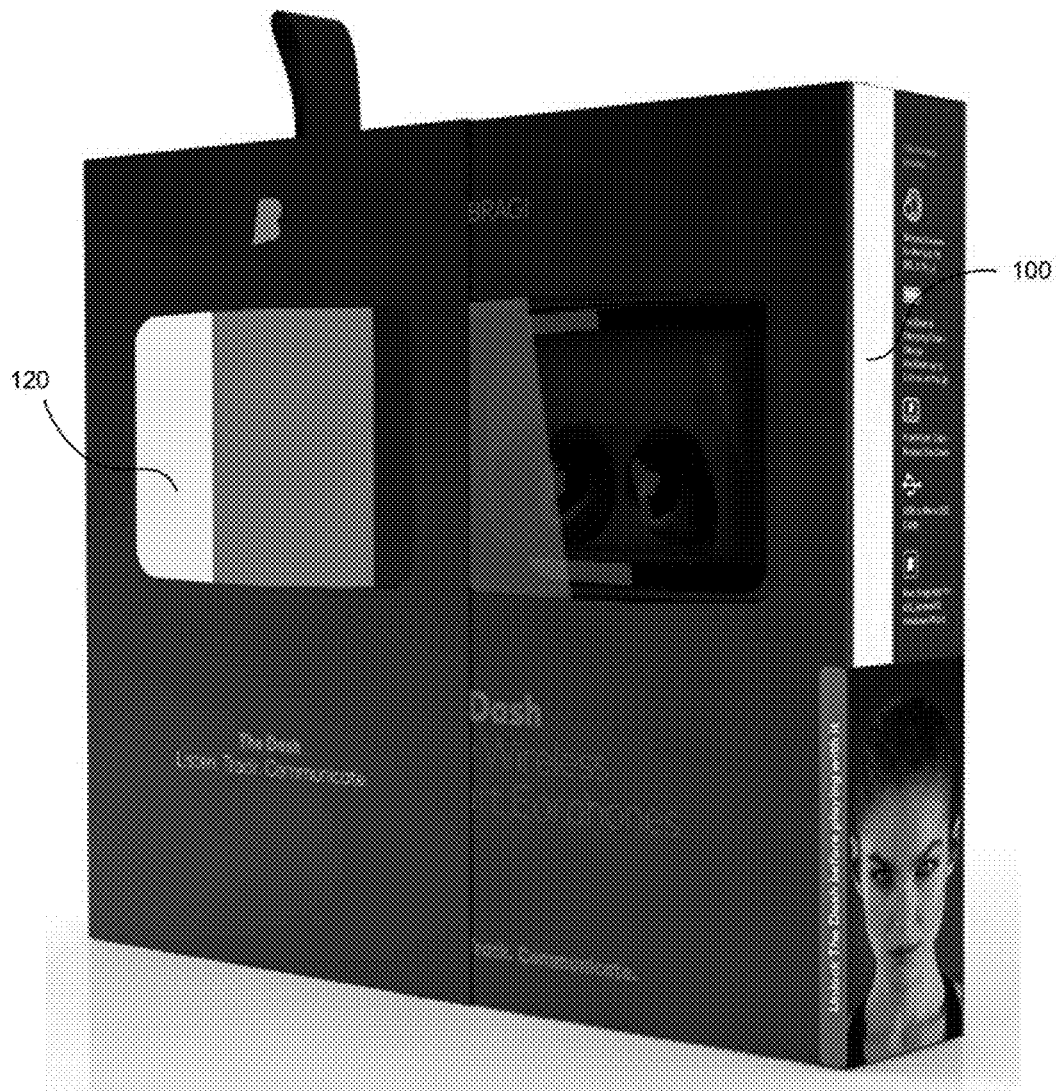
FIG. 2 is a pictorial representation of the packaging system of FIG. 1 in accordance with an illustrative embodiment.

FIGS. 1 and 2 are pictorial representations of a packaging system 100 in accordance with an illustrative embodiment. The packaging system 100 may have any number of components or configurations. The embodiments herein described and shown may be combined in any number of combinations to enhance the structure, functionality, and aesthetics of the packaging system 100. In one embodiment, the packaging system 100 may include a case 101, a hanger 102, a transparent window 104, wireless earpieces 106, a smart case 108, an LED array 110, and an access point 112.

The packaging system 100 is configured to attract buyers and garner attention when stored on store shelves or when hung from display hooks utilizing the hanger 102.

The hanger 102 is a loop or strap utilized to display or store the packaging system 100. In one embodiment, the hanger 102 may be a plastic or fabric loop, clip, hook, or strap that supports the packaging system 100. The case 101 may also be square or rectangular shaped to be stood up, balanced, or otherwise stacked. However, any number of exterior shapes may be utilized for the case 101 of the packaging system 100 based on the desired aesthetics (e.g., spherical, cylindrical, etc.). The case 101 may be formed of cardboard, paper, plastic, metal, polymers, or a combination of materials. The case 101 may include a frame, cases, or other components that may be reinforced utilizing internal structures, supports, and so forth to protect the wireless earpieces 106. The exterior of the case 101 may include labels, text, writing, stickers, or other data or information about the wireless earpieces 106, smart case 108, and contents of the packaging system 100. The case 101 and other internal components of the packaging system excluding the wireless earpieces 106 and the smart case 108 may also be referred to as packaging.

The packaging system 100 may also include the window 104 in the exterior of the packaging system 100 to view the wireless earpieces 106. For example, the window 104 may represent a plastic or glass segment that is integrated with, attached to, or adhered to the case 101. For example, the window 104 may represent a substantially rigid plastic piece sized to display the wireless earpieces 106 and/or the smart case 108. The window 104 may represent one or more windows on any of the sides of the case 101 or within the packaging system 100. In one embodiment, the window 104 may allow for magnified viewing of the contents of the packaging system (e.g., magnified views of text). In another embodiment, the window 104 may be an electronic touchscreen, e-ink, or liquid crystal display that allows for interaction with the device itself or with descriptive materials within the packaging system 100.

The wireless earpieces 106 may be positioned within the smart case 108 or may be separately packaged with the packaging system 100. In one embodiment, the wireless earpieces 106 are packed within the smart case 108 so that the battery and other components of the smart case 108 may be utilized as resources. In one embodiment, the smart case 108 may include LEDs, a touch screen, or other display components that may be activated by the packaging system 100 to help visually display the wireless earpieces 106. In another embodiment, any of the packaging system 100, the smart case 108, and the wireless earpieces 106 may include speakers that may be utilized to supplement the buyer interactions performed by the packing system 100. For example, a beep, audible logo, song, information about the wireless earpieces 106, or other audio information may be played in response to a stimulus being detected (e.g., detected motion, motion of the packaging system 100, light variations, etc.) or other criteria (e.g., timer elapsing, etc.). The window 104 may allow the visual displays or interactions to be more effectively communicated to the buyer.

The access point 112 may represent one or more points or components of the packaging system 100 that allow interaction with the wireless earpieces 106. In one embodiment, the access point 112 may represent a portion of the wireless earpieces 106 that is touch sensitive. For example, the access point 112 may include a cutout that allows the buyer to temporarily activate the wireless earpieces 106 by positioning a finger on the exterior user interface of the wireless earpieces 106. In another embodiment, the access point 112 may represent a portion of the window 104 or case of the packaging system 100. The access point 112 may also include depressions, deformations, or other structures of the case 101 or the window 104 that facilitate interaction of the buyer with the wireless earpieces 106. In one embodiment, the buyer may depress the access point 112 to activate the LED array 110 of the wireless earpieces 106. The access point 112 may also represent one or more bubbles, extensions, or other components that may be pressed or activated to interact with the wireless earpieces 106. For example, a bubble may allow the user to activate the wireless earpieces 106 without actually touching them. Likewise, remote switches, activation buttons, or other components may also be utilized (e.g., push button switch connected to the wireless earpieces 106 by a small wire).

In one embodiment, the LED array 110 represents LEDs integrated with the wireless earpieces 106. For example, the LED array 110 may be utilized to indicate a power status, functional status, mode, or other information when removed from the packaging system 100. The LED array 110 may be activated to attract a buyer's attention whether the packaging system 100 is hanging on a rack, stacked on a shelf, or otherwise positioned. For example, one or more of the NFC chips of the wireless earpieces 106 or of the packaging system 100 may determine the location and orientation of the packaging system 100. If the packaging system 100 is determined to be visible to one or more buyers, the LED array 110 may be activated by the packaging system 100 to attract attention. The packaging system 100 may utilize the sensor available to detect motion in front of or proximate the packaging system 100 to activate device or packaging functions. Sensors of the wireless earpieces 106, such as accelerometers, photo sensors, and so forth, may be utilized to activate the LED array 110. In one embodiment, the logic, microprocessors, or other forms of processing power of the wireless earpieces 106 may be utilized to determine when and how the LED array 110 or other interface components are activated.

In another embodiment, the LED array 110 may represent LEDs of the smart case 108. The LED array 110 within the smart case 108 may surround the receptacles configured to receive the wireless earpieces 106 or may be present on other portions of the frame of the smart case 108. In one example, the LED array 110 may represent the charge status of the smart case 108, whether the wireless earpieces 106 are connected to the smart case 108, synchronization information between the wireless earpieces 106 and the smart case 108, and other similar information. In one embodiment, the LED array 110 may be powered by the smart case 108 until a default power level is reached. For example, the smart case 108 may retain enough power to ensure that the wireless earpieces 106 are fully charged and ready to use once purchased. As a result, power utilized for attracting buyers and showcasing the packaging system 100 may be cut off at a predefined threshold to preserve the charge and full functionality of the wireless earpieces 106 once the packaging system 100 is opened. These sensors and NFC chips may also be integrated with either the smart case 108 or the case 101.

In yet another embodiment, the LED array 110 may be integrated with the case 101. For example, a small disposable battery may power the LED array 110 in response to detecting motion in front of the packaging system 100 or motion of the packaging system 100. As a result, the LED array 110 may represent LEDs of any or all portions of the packaging system 100 including the case 101, the wireless earpieces 106 and the smart case 108.

FIG. 2 is a pictorial representation of the packaging system 100 of FIG. 1 in accordance with an illustrative embodiment. In another embodiment, the packaging system 100 may include a cover 120. The cover 120 may be utilized when shipping the packaging system 100 to further protect the various components. The cover 120 may slide over the case 101 to cover and protect the packaging system 100. In one embodiment, the cover 120 may be transparent or include transparent windows, a touch screen, or cut-outs to display the wireless earpieces 106 and other display components of the packaging system 100.

Figure 3:
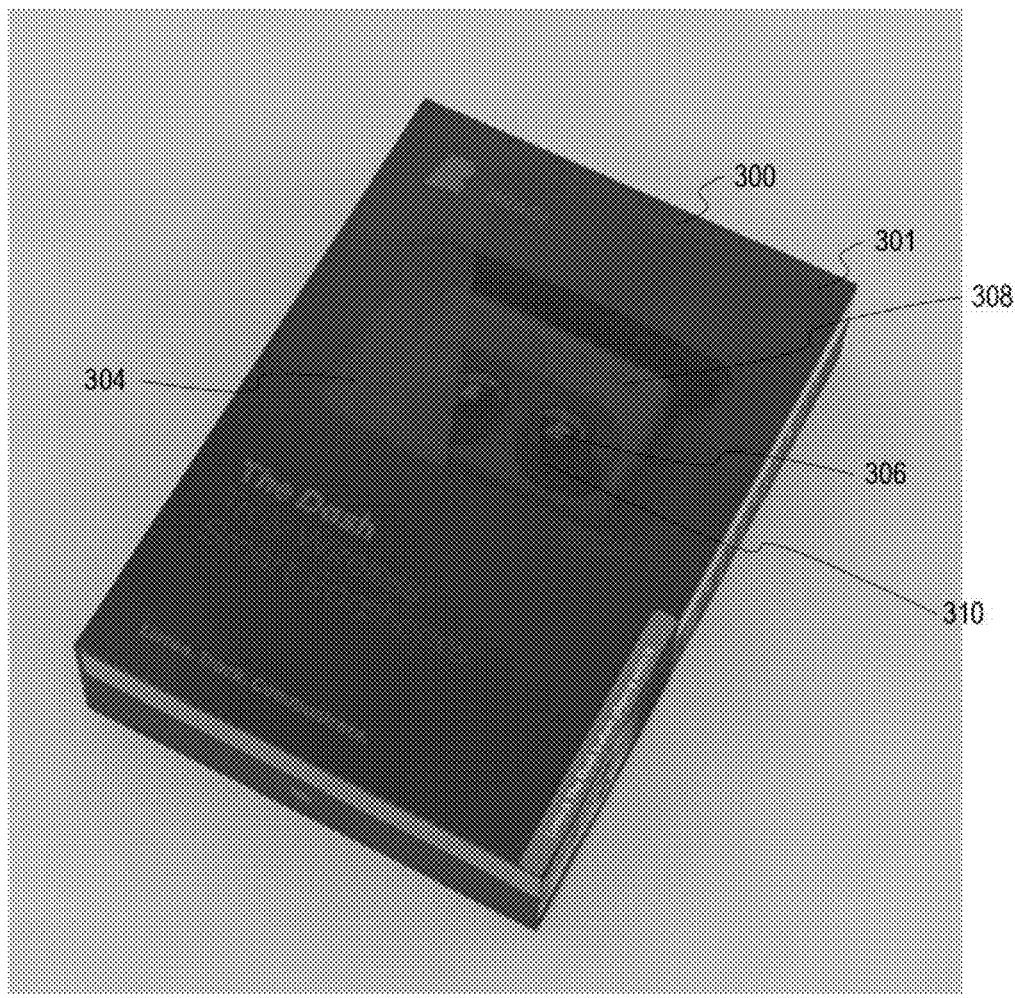
FIG. 3 is a pictorial representation of reduced size packaging system in accordance with an illustrative embodiment.

FIG. 3 is a pictorial representation of a reduced size packaging system 300 in accordance with an illustrative embodiment. In one embodiment, the packaging system 300 may be similar to the packaging system 100 of FIG. 1 including a case 301, a transparent window 304, wireless earpieces 306, a smart case 308, and an LED array 310. However, the packaging system 300 may be miniaturized or have a reduced footprint to preserve shelf, storage, or retail space, decrease shipping costs (e.g., associated with size and weight), preserve economic and environmental resources, and so forth.

In the various embodiments, the orientation of the wireless earpieces 306 within the case 301 may vary based on the size and shape of the packaging system 300 and the corresponding case 301. For example, as shown, the wireless earpieces 306 and corresponding transparent window 304 are positioned such that wireless earpieces 306 may be most visible when the case 301 is positioned vertically. In other embodiments, the wireless earpieces 306 and the transparent window 304 may be positioned such that the wireless earpieces 306 are visible when the case 301 is positioned horizontally (or alternatively on either of the edges of the case 301 as shown).

Figure 4:
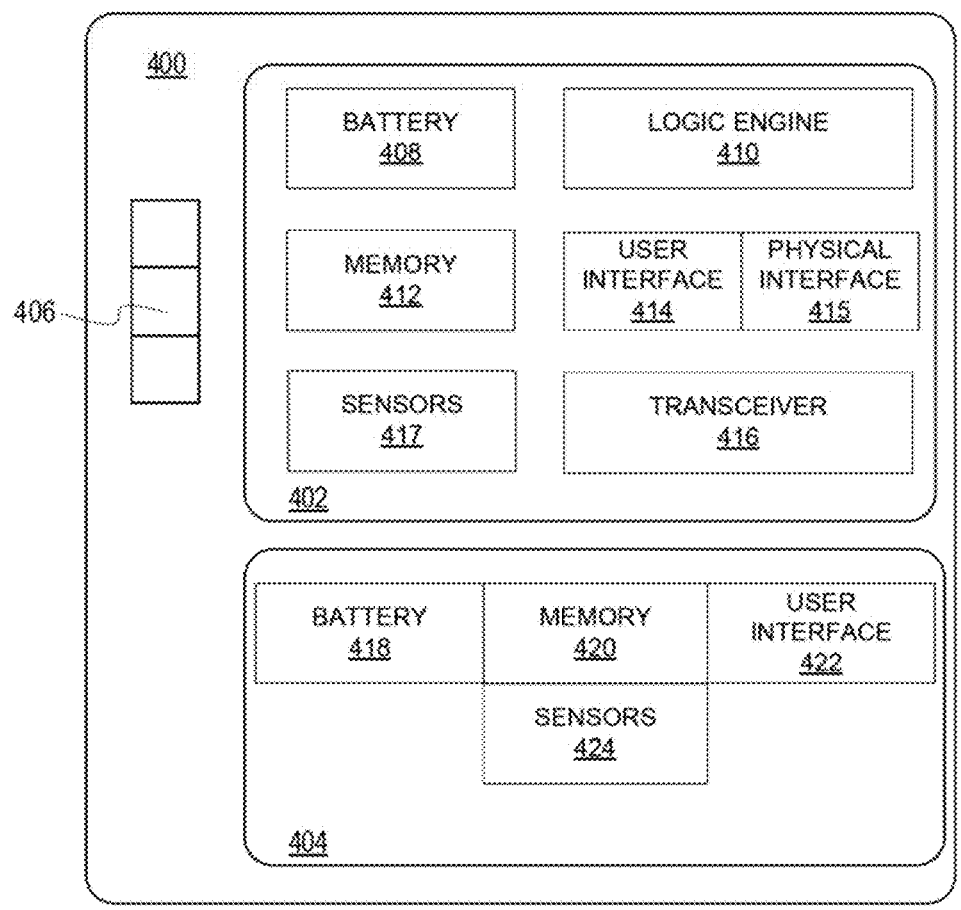
FIG. 4 is a block diagram of a packaging system in accordance with an illustrative embodiment.

FIG. 4 is a block diagram of a packaging system 400 in accordance with an illustrative embodiment. In one embodiment, the packaging system 400 may include wireless earpieces 402 (described collectively rather than individually), a smart case 404, and case components 406. As previously described, the packaging system 400 may communicate with or detect other packaging systems (not shown).

The packaging system 400 may utilize functionality and components of each of the wireless earpieces 402, the smart case 404, and the case components 406 to implement the functions and processes herein described. The packaging system may have any number of configurations and may include various circuitry, connections, and other components. The packaging system 400 is one potential embodiment of the packaging system 100 of FIG. 1.

In one embodiment, the wireless earpieces 402 may include a battery 408, a logic engine 410, a memory 412, user interface 414, physical interface 415, a transceiver 416, and sensors 417. The smart case 404 may have a battery 418, a memory 420, an interface 422, and sensor or sensors 424. The battery 408 is a power storage device configured to power the wireless earpieces 402. Likewise, the battery 418 is a power storage device configured to power the smart case 404. In other embodiments, the batteries 408 may represent a fuel cell, thermal electric generator, piezo electric charger, solar charger, ultra-capacitor, or other existing or developing power storage technologies.

The logic engine 410 is the logic that controls the operation and functionality of the wireless earpieces 402. The logic engine 410 may include circuitry, chips, and other digital logic. The logic engine 410 may also include programs, scripts, and instructions that may be implemented to operate the logic engine 410. The logic engine 410 may represent hardware, software, firmware, or any combination thereof. In one embodiment, the logic engine 410 may include one or more processors. The logic engine 410 may also represent an application specific integrated circuit (ASIC) or field programmable gate array (FPGA). The logic engine 410 may be utilize information and from the sensors 417 to determine the location and orientation of the packaging system 400. The logic engine 402 may utilize this information and other criteria to determine when to activate the user interface 414.

For example, a processor included in the logic engine 410 is circuitry or logic enabled to control execution of a set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor may be a single chip or integrated with other computing or communications elements of the smart case 402.

The memory 412 is a hardware element, device, or recording media configured to store data for subsequent retrieval or access at a later time. The memory 412 may be static or dynamic memory. The memory 412 may include a hard disk, random access memory, cache, removable media drive, mass storage, or configuration suitable as storage for data, instructions, and information. In one embodiment, the memory 412 and the logic engine 410 may be integrated. The memory may use any type of volatile or non-volatile storage techniques and mediums. The memory 412 may store information related to the status of the smart case 402 as well as the wireless earpieces 402. In one embodiment, the memory 412 may display instructions or programs for controlling the user interface 414 including one or more LEDs or other light emitting components, speakers, tactile generators (e.g., vibrator), and so forth.

The transceiver 416 is a component comprising both a transmitter and receiver which may be combined and share common circuitry on a single housing. The transceiver 416 may communicate utilizing Bluetooth, Wi-Fi, ZigBee, near field communications, wireless USB, infrared, mobile body area networks, ultra-wideband communications, or other suitable radio frequency standards, networks, protocols, or communications. The transceiver 416 may also be a hybrid transceiver that supports a number of different communications. For example, the transceiver 416 may communicate with the smart case 404 or other packaging systems utilizing wired interfaces (e.g., wires, traces, etc.), NFC or Bluetooth communications.

The components of the wireless earpieces 402 (or the packaging system 400) may be electrically connected utilizing any number of wires, contact points, leads, busses, wireless interfaces, or so forth. In addition, the wireless earpieces 402 may include any number of computing and communications components, devices or elements which may include busses, motherboards, circuits, chips, sensors, ports, interfaces, cards, converters, adapters, connections, transceivers, displays, antennas, and other similar components.

The physical interface 415 is hardware interface for connecting and communicating with the smart case 404 or other electrical components. The physical interface 415 may include any number of pins, arms, or connectors for electrically interfacing with the contacts or other interface components of the smart case 404 or other charging or synchronization devices. For example, the physical interface 415 may be a micro USB port. In one embodiment, the physical interface 415 is a magnetic interface that automatically couples to contacts or an interface of the smart case 404. In another embodiment, the physical interface 415 may include a wireless inductor for charging the wireless earpieces 402 without a physical connection to the smart case 404 or other devices.

The user interface 414 is a hardware interface for receiving commands, instructions, or input through the touch (haptics) of the user. The user interface 414 may be utilized to control the other functions of the wireless earpieces 402. The user interface 414 may include the LED array, one or more touch sensitive buttons or portions, a miniature screen or display, or other input/output components. The user interface 414 may be controlled by the user or based on commands received from other components or interactions with the packaging system 400. The LED arrays may be utilized to perform one or more display actions alone or in synchronization with other packaging systems. For example, lighting up the LEDs in a pattern or in a way that highlights text or other content of the packaging system 400.

The sensors 417 may include accelerometers, gyroscopes, magnetometer or other inertial sensors, photo detectors, miniature cameras, and other similar instruments for detecting location, orientation, motion, and so forth even when the wireless earpieces 402 are packaged within the packaging system 400. In another embodiment, the smart case 404 or the case components 406 may also include sensors for detecting the location, orientation, and proximity of the packaging system 400 to other packaging systems. The case components 406 may also include an LED array, battery, galvanic linkage, solar charger, actuators or vibrators, one or more touch screens or displays, an NFC chip, or other components as are referenced or described herein. In one embodiment, the packaging system 400 includes galvanic or touch sensors or electronic ink that may determine when and how the display actions of the packaging system 400 are activated. In one embodiment, the packaging system 400 may change colors when touched by a user or picked up. The packaging system 400 may also change colors to highlight different portions of the packaging system 400 based on touch.

The smart case 404 may include components similar in structure and functionality to those shown for the wireless earpieces 402 including the battery 418, the memory 420, and the user interface 422. Although not shown, the smart case 404 may include logic or microprocessor for implementing the processes and functions as are herein described. The battery 418 of the smart case 404 may have extra capacity which may be utilized by the packaging system to perform the display operations and processes herein described. For example, the wireless earpieces 402 may be connected, linked, or nested within the smart case 404 so that the battery 418 can maintain the charge of the battery 408 as well as powering the user interfaces 414 and/or 422 to attract potential buyers to the packaging system 400. In one embodiment, the battery 418 may be utilized until a power threshold is met. For example, the power threshold may require enough power to maintain and charge the wireless earpieces 402 for a month or more in a low power, power saving, sleep, or storage mode.

The user interface 422 of the smart case 404 may also include a touch interface or display for indicating the status of the smart case 402. For example, a light may indicate the battery status of the smart case 402 as well as connected wireless earpieces 402, download/synchronization status (e.g., synchronizing, complete, last synchronization, etc.), or other similar information. An LED array of the user interface 422 may also be utilized for display actions. In another embodiment, device status indications may emanate from the LED array of the wireless earpieces 402 themselves, triggered for display by the user interface 422 of the smart case 404.

The battery 408 may itself be charged through a physical interface of the user interface 422. The physical interface may be integrated with the user interface 422 or may be a separate interface. For example, the user interface 422 may also include a hardware interface for connecting the smart case to a power supply or other electronic device. The user interface 422 may be utilized for charging as well as communications with externally connected devices. For example, the interface 410 may represent a mini-USB, micro-USB or other similar miniature standard connector. In another embodiment, a wireless inductive charging system may be utilized to initially replenish power to the wireless earpieces 402, the same inductive charging system may function in the same fashion over long periods of utility after the user purchases the device. The packaging system 400 may also charge the smart case 404 utilizing inductive charging.

Figure 5:
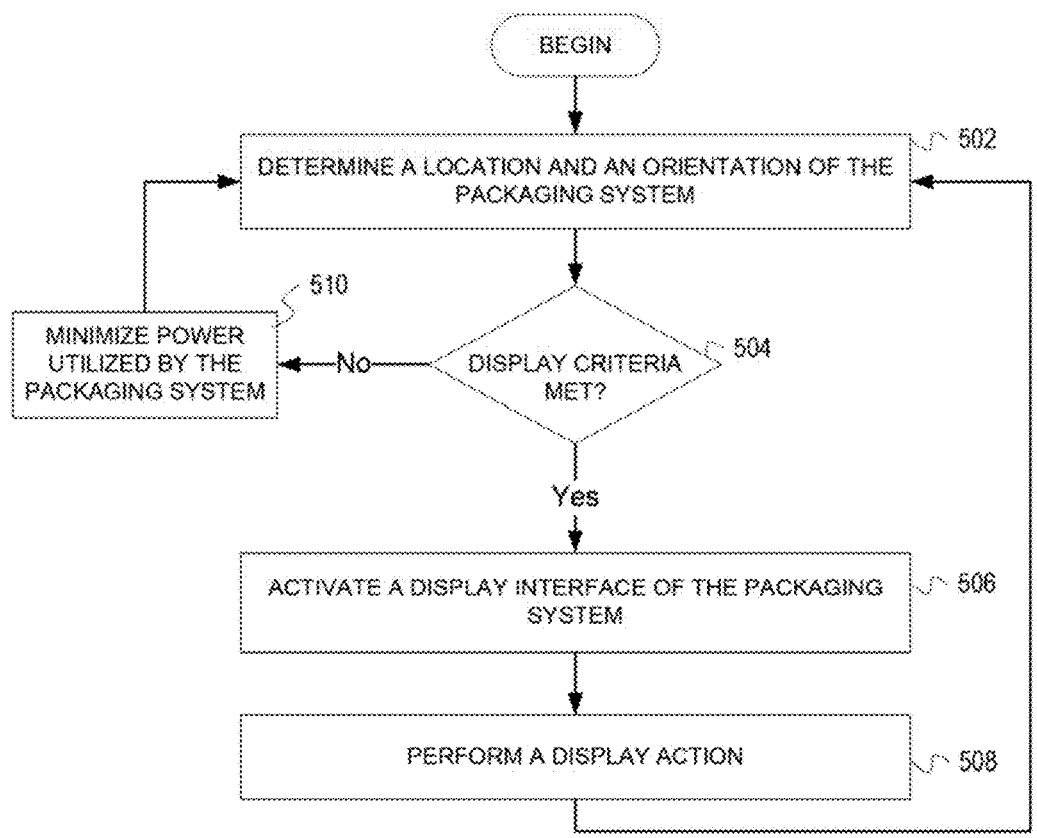
FIG. 5 is a flowchart of a process for utilizing a packaging system in accordance with an illustrative embodiment.

FIG. 5 is a flowchart of a process for utilizing a packaging system in accordance with an illustrative embodiment. In one embodiment, the process of FIG. 5 may be implemented by a packaging system, such as the packaging systems 100 and 300 of FIGS. 1 and 3. The process may begin by determining a location and an orientation of the packaging system (step 502). In one embodiment, the location and orientation of the packaging system may be determined utilizing an NFC chip and one or more sensors integrated with the packaging system. For example, the NFC chip and the one or more sensors may be part of the wireless earpieces being shipped in the packaging system. Alternatively, the NFC chip and the one or more sensors may be part of a smart case within the packaging system or part of the packaging system itself. In one embodiment, the NFC chip communicates with, or links to other NFC chips in adjacent devices or packaging systems. For example, the NFC chip may request a response from the other NFC chips.

In one embodiment, the NFC chip may include a directional antenna that is utilized to determine the orientation or location of adjacent devices. The NFC chip may also determine location of devices based on the power level of the signal utilized. Although near field communications are disclosed, as one potential communications type for performing communications between packaging systems, any number of other communications standards or protocols may be utilized (e.g., Bluetooth, Wi-Fi, ZigBee, etc.).

The orientation of the packaging system may be determined utilizing one or more sensors. For example, and accelerometer or gyroscope may be utilized to determine whether the packaging system is vertically aligned, horizontally aligned, or so forth with regard to the display components of the packaging system. For example, the packaging system may only want to perform a display action if the display components would be visible to potential buyers. A photo sensor may also be utilized to determine the position of the packaging system. For example, if the packaging system is tightly packed in the middle of a stack of other packaging systems the photo sensor may not detect sufficient light; the packaging system does not want to use battery life to perform a display action in that scenario. The photo sensor may look for light and/or movement. For example, movement may correspond to potential buyers walking the aisles of a retail store with shelves in which the packaging system is positioned. The movement or motion detected by an accelerometer or photo sensor may also correspond to motion of the packaging system. In another embodiment, galvanic interfaces may detect contact, such detection would trigger activation of the display actions associated with the packaging system. The packaging system may also utilize electronic ink (e.g., black and white or color e-ink) or touch sensitive pages (e.g., pages with wires, conductors, or other sensors integrated) to activate display actions. The display actions may also include changing the text displayed by each page from a first set of content to a second set of content and so forth until all applicable content has been displayed.

Next, the packaging system determines whether display criteria are met (step 504). The display criteria may include one or more thresholds for orientation, location, motion, detected light, or so forth. In one embodiment, the display criteria may require that the packaging system be in front of a number of other packages or visible to a buyer. The display criteria are utilized to maximize exposure of the packaging system to one or more potential buyers while simultaneously maintaining battery life. As a result, only packaging systems that are is visible to the buyer are activated to perform an interactive display action.

In another embodiment, the packaging system may utilize a time to process as the display criteria. For example, the packaging system may activate display components once every minute during daylight or store hours to potentially attract buyers. In one embodiment, the packaging system may utilize the logic or processing power of the included electronic devices to make the determination of step 504.

If the display criteria are met, the packaging system activates a display interface of the packaging system (step 506). The display interface may be activated to respond to an external stimulus or criteria previously determined by the packaging system during step 504. In one embodiment, the packaging system may be activated from a sleep, power-down, power saving, or other low power mode. The display interface may include one or more LEDs, lights, touch interfaces, speakers, tactile interfaces (e.g., vibration component), or other interface components of the packaging system which may include discrete components such as an encased electronic device, smart case, and electronic components of the packaging system (e.g., case, inserts, etc.).

Next, the packaging system performs a display action (step 508). The display action may be a predefined communication of lights, sounds, signals, or other information. In one embodiment, the display action may be dependent on the location and orientation of the packaging system previously determined. For example, if multiple packaging systems are positioned adjacent each other, the packaging systems may sequentially, simultaneously, or concurrently light up corresponding LED arrays to attract attention to the packaging systems. The packaging systems, may light up sequentially to perform an electronic "wave" for potential buyers. The display actions may take place simultaneously, sequentially, concurrently, or individually to attract the interest of the buyer and to provide a more effective display.

In another embodiment, the display action may be performed independently by the packaging system. For example, the packaging system may be at the front of a hanging display or other display where only the packaging system is visible while other packaging systems behind it are not visible and may be instead in a power saving mode. In one embodiment, any number display actions that are hard-wired, pre-programmed, or dynamically updated may be performed by the packaging system. In one embodiment, the packaging system may walk the user through the dynamically or statically displayed user manual, marketing information, or so forth.

Next, the packaging system determines a location and an orientation of the packaging system (step 502). If no movements or changes of the packaging system have happened, the packaging system may utilize the previous determinations for location and orientation of the packaging system. The information of step 502 may also include the likelihood of display to a potential buyer.

If the packaging system determines the display criteria is not met during step 504, the packaging system minimizes power utilized (step 510). In one embodiment, the packaging system may enter a low power mode. In the low power mode, minimal functionality of the included electronic devices is maintained. For example, the packaging system may wake up the system at preset intervals, such as every two hours, to determine whether the location and orientation of the packaging system are the same and whether the display criteria are still met as described in steps 502 and 504. In one embodiment, the packaging system may sense changes in the environment of the packaging system every (e.g., sensing every 100 ms or 10 s) and then increase the sample rate of the sensors (e.g., increasing to sensing every 4 ms or 1 minute) in response to entering a lower power mode. The sensors may include accelerometers, gyroscopes, light meters, and other input devices. The packaging system may move back and forth between and active mode for performing display actions and a low power or sleep mode in response to specific criteria, such as time of day, motion, light, etc. During step 510, the packaging system may also reduce or eliminate unnecessary display actions and device activations to maximize the battery life of the electronic devices enclosed within the packaging system.

The embodiments are not to be limited to the particular embodiments described herein. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A packaging system for wireless earpieces, comprising:
    wireless earpieces including one or more sensors and a near field communication chip, wherein the near field communication chip communicates with a plurality of packaging systems if present adjacent to the packaging system; and
    packaging defining a window for displaying the wireless earpieces, wherein the packing prevents damage to the wireless earpieces, and wherein the packaging performs a display action in response to a display criteria being met.

2. The packaging system of claim 1, wherein the packaging includes a smart case securing the wireless earpieces and powering the wireless earpieces during storage.

3. The packaging system of claim 2, wherein a light emitting diode array of the wireless earpieces or smart case is activated to perform a display action in response to detecting motion near the packaging system.

4. The packaging system of claim 3, wherein the light emitting diode array is activated to perform the display action in response to determining the packaging system is visible to users.

5. The packaging system of claim 1, wherein the packaging system enters a power saving mode in response to determining at least one of the plurality of packaging systems are in front of the packaging system.

6. The packaging system of claim 1, wherein the one or more sensors include at least an accelerometer and a photo sensor for detecting motion near the packaging system.

7. The packaging system of claim 1, wherein the one or more sensors include a galvanic sensor configured to detect user contact with the packaging system.

8. The packaging system of claim 1, wherein the packaging includes one or more sensors for detecting motion of the packaging system or near the packaging system.

9. The packaging system of claim 1, wherein the packaging system and the plurality of packaging systems synchronize display actions utilizing near field communications.

10. The packaging system of claim 1, wherein the display actions including lighting a plurality of LED arrays sequentially or simultaneously.

11. The packaging system of claim 1, further comprising:
    a battery within the packaging that powers the smart case and supplies power to charge the wireless earpieces.

12. The packaging system of claim 2, wherein a battery of the smart case powers the display actions of the packaging system.

13. The packaging system of claim 1, wherein the display criteria includes a time period elapsing.

14. The packaging system of claim 1, wherein the packaging defines a hook for hanging the packaging system.

15. A method of managing display actions performed by a packaging system for wireless earpieces, comprising:
    determining a location and an orientation of the packaging system;
    determining whether display criteria are met;
    performing a display action utilizing an interface of the packaging system to attract attention of a user in response to the display criteria being met; and
    interacting with a user via an access point.

16. The method of claim 15, wherein the packaging system includes at least a smart case for the wireless earpieces.

17. The method of claim 15, wherein the location and the orientation of the packaging system is determined utilizing one or more sensors of the wireless earpieces.

18. The method of claim 15, wherein the location and the orientation of the packaging system is determined utilizing one or more of the sensors of the packaging system.

19. The method of claim 15, wherein performing the display action comprises lighting up an LED array of one or more of the pair of wireless earpieces and the smart case.

20. The method of claim 15, wherein performing the display action comprises activation of a display, where the display is one of a transparent liquid crystal display, an e-ink color display, and an e-ink black and white display.

* * * * *